US010110026B2

(12) United States Patent
Yuan et al.

(10) Patent No.: US 10,110,026 B2
(45) Date of Patent: Oct. 23, 2018

(54) WIRELESS SENSOR NETWORK CHARGING METHOD FOR MULTI-CHARGE NODES

(71) Applicant: HEFEI UNIVERSITY OF TECHNOLOGY, Anhui (CN)

(72) Inventors: Lifen Yuan, Anhui (CN); Peng Chen, Anhui (CN); Yigang He, Anhui (CN); Shuai Luo, Anhui (CN); Zhijie Yuan, Anhui (CN); Zhen Cheng, Anhui (CN); Deqin Zhao, Anhui (CN); Yesheng Sun, Anhui (CN); Lei Wu, Anhui (CN)

(73) Assignee: HEFEI UNIVERSITY OF TECHNOLOGY, Anhui (CN)

( * ) Notice: Subject to any disclaimer, the term of this patent is extended or adjusted under 35 U.S.C. 154(b) by 0 days.

(21) Appl. No.: 15/536,138

(22) PCT Filed: Nov. 24, 2015

(86) PCT No.: PCT/CN2015/095390
§ 371 (c)(1),
(2) Date: Jun. 15, 2017

(87) PCT Pub. No.: WO2016/180004
PCT Pub. Date: Nov. 17, 2016

(65) Prior Publication Data
US 2017/0353044 A1 Dec. 7, 2017

(30) Foreign Application Priority Data
May 12, 2015 (CN) .......................... 2015 1 0237380

(51) Int. Cl.
*H02J 7/00* (2006.01)
*H02J 7/14* (2006.01)
(Continued)

(52) U.S. Cl.
CPC ......... *H02J 7/0027* (2013.01); *B60L 11/1809* (2013.01); *H02J 7/0013* (2013.01); (Continued)

(58) Field of Classification Search
CPC .................................................. H02J 7/0027
See application file for complete search history.

(56) References Cited

FOREIGN PATENT DOCUMENTS

| CA | 2533975 | 7/2006 |
|---|---|---|
| CN | 102157988 | 8/2011 |

(Continued)

OTHER PUBLICATIONS

Shi et al., "On Renewable Sensor Networks with Wireless Energy Transfer," Proceedings IEEE INFOCOM, Apr. 2011, pp. 1350-1358.

(Continued)

*Primary Examiner* — Edward Tso
*Assistant Examiner* — Ahmed Omar
(74) *Attorney, Agent, or Firm* — JCIPRNET

(57) ABSTRACT

A wireless sensor network sensor network charging method for multi-charge nodes, including the following steps: (1) establishing a WSNs model; (2) dividing field ranges of charging trolleys; and (3) charging the charging trolleys: (a) initializing: l=0 and j=0, wherein l is the total number of received alarm nodes, and j is the serial number of an alarmed node; (b) receiving an alarm signal, updating values of l and j, generating a shortest charging path $s_l$, and computing an energy discriminate vector; (c) if a vector element satisfies $Q_{lj} \leq 5\%$ B and j=1, 2, . . . , l, then executing a charging task on l alarm nodes according to the shortest charging path $s_l$ corresponded thereby, otherwise, returning to continuously update the values of l and j; (d) executing the charging task; and (e) determining whether the charging trolleys are required to go back to a parking lot for recharging, enabling the charging trolleys to go back to the parking lot for recharging if yes, and otherwise, returning to continuously update the values of l and j and the vector element $Q_{lj}$.

8 Claims, 2 Drawing Sheets

(51) Int. Cl.
  *H04W 84/18*  (2009.01)
  *B60L 11/18*  (2006.01)
  *G06F 1/32*  (2006.01)

(52) U.S. Cl.
  CPC ........... *H02J 7/1423* (2013.01); *H04W 84/18* (2013.01); *G06F 1/3212* (2013.01); *H02J 7/1446* (2013.01); *H02J 2007/0096* (2013.01); *H02J 2007/0098* (2013.01); *H02J 2007/143* (2013.01)

(56) References Cited

FOREIGN PATENT DOCUMENTS

| | | |
|---|---|---|
| CN | 102355067 | 2/2012 |
| CN | 202190128 | 4/2012 |
| CN | 103219779 | 7/2013 |
| CN | 104953643 | 9/2015 |

OTHER PUBLICATIONS

"International Search Report (Form PCT/ISA/210)", dated Feb. 23, 2016, with English translation thereof, pp. 1-4.

WIRELESS SENSOR NETWORK CHARGING METHOD FOR MULTI-CHARGE NODES

CROSS-REFERENCE TO RELATED APPLICATION

This application is a 371 of international application of PCT application Ser. No. PCT/CN2015/095390, filed on Nov. 24, 2015, which claims the priority benefit of China application no. 201510237380.5, filed on May 12, 2015. The entirety of each of the above-mentioned patent applications is hereby incorporated by reference herein and made a part of this specification.

TECHNIQUE FIELD

The invention relates to the field of wireless sensor network energy transmission, in particular, to a wireless sensor network charging method for multi-charge nodes.

BACKGROUND

Due to developments of magnetic resonance and magnetic coupling wireless energy transmission and research breakthrough of ultra-speed charging battery materials in recent years, much more attention has been put on researches regarding the distribution of moving charging nodes in wireless sensor network (also known as charging trolley) to achieve sensor energy supplement in the network.

Wireless sensor network is typically applied in surveillance sector, hundreds or thousands of sensors distributed in the network are used to collect data and transfer the data to a base station by using its own communication model directly or through jumpers. The base station collects all the information and sends the information to surveillance personnel to achieve the purpose of monitoring. Process of information transmission includes data treatment, integration and node-to-node communication, which are all the main causes of sensor energy consumption.

In order to guarantee the durability of the wireless sensor network (WSNs) during surveillance cycles without consuming all the energy in the network, a practical and effective method must be established to recharge the sensor nodes in the network and to achieve best charging trolleys dispatch which enables the total consumption of the charging trolleys to be the minimum in every charging task.

As put forward by Y. Shi in document, "On renewable sensor network works with wireless energy transfer. Proc. of INFOCOM, IEEE in 2011", the use of distributing charging trolleys in WSNs, which can visit every sensor in the network periodically, to achieve sensor energy supplement is limited by fixed time intervals.

Researches related to charging methods for wireless sensor network distributed with multiple charging trolleys mainly involve two aspects of problem: one, choosing a shortest path to achieve minimum consumption; and two, scheduling of the charging trolley.

SUMMARY

In order to avoid the limitation due to fixed time intervals in the traditional method, the invention provides a wireless sensor network charging method for multi-charge nodes.

The wireless sensor network charging method for multi-charge nodes of the invention is a self-adaptive charging method designed with respect to the independence of each charging trolley.

The self-adaptive charging method is set in the wireless sensor network (WSNs), in which all the charging trolleys are separated and mutually independent, conduct charging tasks within their own ranges, and are capable of automatically selecting a starting time for charging process. The above work is repeated every time after completing the charging task, and it is not limited by time intervals and not affected by other charging trolleys.

Because all the charging trolleys are mutual independent, a degree of complication of the method is only limited within the complication degree of distributing one charging trolley.

Techniques Adopted the Invention:

A WSNs charging method for multi-charge nodes, including the following steps:
  (1) establishing a WSNs model: by randomly distributing hundreds or thousands of sensors in a large surveillance area, with q number of charging trolleys and q number of parking lots, wherein a surveillance cycle is T;
  a set of sensors being V, that is: $V=\{v_1, v_2, v_3 \ldots\}$ and $v_1, v_2$ and $v_3$ are respectively a first, a second and a third sensors; a battery capacity of each sensor being B, a consumption rate of the $j^{th}$ sensor being $\rho_j$, a low energy alarm threshold being $M_j$, $M_j=\alpha \cdot B$, and $0<\alpha<1$, wherein $\alpha$ is a percentage of the low energy alarm threshold $M_j$ accounted for the sensor energy B;
  i being a serial number of the charging trolley which is parked in the parking lot at a position $r_i$, $r_i=(x_i, y_i)$, $1 \le i \le q$, $x_i$ and $y_i$ respectively representing the two dimensional map coordinates of the position $r_i$, q being the quantity of the charging trolleys; a base station being used to collect sensor information and communicate with the charging trolleys; the parking lots being used to recharge the charging trolleys; the battery capacity of every charging trolley being E, a moving speed being a stable value S, and a sensor charging time for every charging trolley being a fixed value C;
  (2) dividing a field range for every charging trolley;
  (3) conducting a charging task by each charging trolley.

Further, in the aforesaid step (2), detail steps of dividing the field range for every charging trolley are:
  (2.1) generating an expansion node: by using a closed circuit $\eta$ to encircle q number of charging trolleys and their parking lots in the sensor, wherein the circuit $\eta$ does not include other sensor node therein, thus the circuit $\eta$ is the expansion node;
  (2.2) by using the expansion node as a root node, the sensor node being the smallest spanning tree $\psi$ generated by a tree branch node;
  (2.3) decomposing the smallest spanning tree y: by taking q number of parking lots as the root nodes, decomposing the smallest spanning tree into q number of un-intersected root trees, and the upper limit for the total number of nodes in every root tree being:

$$K = \left\lceil \frac{A}{q} \right\rceil,$$

wherein A is the total number of sensor nodes in the sensor network, q is the quantity of charging trolleys, and $\lceil \cdot \rceil$ indicates to round up; A being the total number of sensor nodes in the sensor network;
  (2.4) connecting outer surrounding nodes of every root tree to form q number of circuits $\zeta_1 \zeta_2 \ldots \zeta_q$, wherein the circuit $\zeta_i$ (i=1, 2, ..., q) represents the field range of the $i^{th}$ charging trolley.

Further, in the aforesaid step (3), detail steps of conducting the charging task by each charging trolley are:

(3.1) the charging trolleys receiving a total number of alarm sensor nodes and a serial number of an alarmed sensor node, and initializing: l=0, j=0, wherein l is the total number of alarm sensor nodes being received, and j is the serial number of the alarmed sensor node;

(3.2) the charging trolleys starting to receive signals emitted from a low energy sensor, the charging trolleys updating the values of l,j after receiving the alarm signals and generating a shortest charging path $s_l$ for every l value, and the charging trolleys calculating an energy discriminant vector Q, wherein l is the total number of alarm sensor node being received, and j is the serial number of the alarmed sensor node;

(3.3) if an element $Q_{lj}$ of the energy discriminant vector Q is ≤5% B and j=1, 2, . . . , l, wherein l is the total number of alarm sensor nodes being received, j is serial number of the alarmed sensor node, and B represents the battery capacity of each sensor, then conducting the step (3.4) based on the shortest charging path $s_l$, otherwise, returning back to the step (3.2);

(3.4) conducting the charging task: that is, the charging trolleys start to charge the sensors;

(3.5) the charging trolleys determining whether returning back to the parking lots for recharging is required, and if it is required, then the charging trolleys return back to parking lots for recharging; otherwise, returning back to the step (3.2).

Further, in the aforesaid step (3.2), the method of generating the shortest charging path $s_l$ is: a set of all the alarmed sensors being $V^c=(v_1^c, v_2^c, v_3^c \ldots v_l^c)$; by using the charging trolleys as the start-point, selecting a path $e_m$ with the smallest Euclidean distance in l number of paths that connect with the charging trolleys, wherein $e_m$ connects another alarmed sensor node $v_i^c$ with the charging trolleys; next, by using the sensor node $v_i^c$ as the start-point, selecting a path $e_n$ with the smallest Euclidean distance from the remaining l−1 paths which excludes the path $e_m$, wherein $e_n$ connects the alarmed sensor node $v_i^c$ with the alarmed sensor node $v_{i'}^c$; and in this analogy, obtaining the shortest charging path $s_l$ in which the charging trolleys are being used as the start-point and l number of to-be-charged sensor nodes are being passed by.

Further, in the aforesaid step (3.2), the meaning of the energy discriminant vector Q is: a vector consisting of the minimum residual energy under conditions of assuming that the charging task starts when l number of alarm signals are received, and the $j^{th}$ alarmed sensor node is arranged to be charged at the last.

Further, in the aforesaid step (3.2), the form of the energy discriminant vector Q is: $[Q_{l1} \ Q_{l2} \ \ldots \ Q_{lj} \ \ldots \ Q_{ll}]$, j=1, 2, . . . , l; and a method of calculating the element $Q_{lj}$ of the energy discriminant vector is:

$$Q_{lj} = M_j - \rho_j \cdot \left[\frac{D}{S} + l \cdot C + (t - t_j)\right],$$

wherein $M_j$ is a low energy alarm threshold, the threshold is set as $M_j$=20% B, B represents the battery capacity of each sensor, $\rho_j$ is an energy consumption rate of the $j^{th}$ alarmed sensor node, l is the total number of alarm sensor nodes being received, D is a total length of the shortest charging path corresponded by l, S is the moving speed of the charging trolleys, C is a charging time required by each sensor, C is a constant value, t is the current time that the charging trolleys calculate the vector element, and $t_j$ is an alarming time of the $j^{th}$ alarm sensor node recorded by the charging trolleys.

Further, in the aforesaid step (3.5), bases for the charging trolleys to determine whether returning back to parking lots for recharging is required are: a remaining energy $E_\mu$ of the charging trolleys being ≤5% E, wherein $E_\mu$ is assumed to be the energy remained in the charging trolleys after the charging trolleys returned back to the parking lots to conduct the charging task again, and E is a battery capacity of the charging trolleys;

$E_\mu$ is calculated according to: $E_\mu = E' - (Q_{r \to r_i'} + Q_c + \Delta Q)$, wherein E' is a remaining energy at the current moment when the charging trolleys made the determination, $Q_{r \to r_i'}$ is an energy consumed while the charging trolleys completed the charging task and returned back to parking lots, ΔQ is an extra energy loss by the charging trolleys under the influence of surrounding environment, and $Q_c$ is an energy expected to be consumed when conducting the charging task again.

$Q_c$ is calculated according to: $Q_c = \lambda \cdot D' + (l-l') \cdot B - (B'_{l'+1} + B'_{l'+2} + \ldots B'_l)$, wherein λ is an energy consumption of the charging trolleys per unit distance, l is the total number of alarm sensor nodes being received, l' represents a total number of alarm released sensor nodes at the moment that the charging trolleys made the determination, D' is a total length of the shortest path generated corresponding to l at the moment that the charging trolleys made the determination, $B'_{l'+1}$ is a remaining energy of the $l'+1^{th}$ alarm sensor node, $B'_{l'+2}$ is a remaining energy of the $l'+2^{th}$ alarm sensor node, $B'_l$ is a remaining energy of the $l^{th}$ alarm sensor node, and B is the battery capacity of the sensors.

The invention, as compared to the convention technology, has the following advantages:

(1) The sensor energy consumption rate and the remaining energy can be considered as together as a whole and do not need to be analyzed solely, thereby avoiding time constraints set forth by charging at fixed time intervals, and being capable of self-adaptively changing a charging strategy based on the variation of the sensor energy information in the network.

(2) By utilizing the invention, all the charging trolleys are mutually independent, and the method complexity is equivalent to the complexity of deploying one charging trolley, and thus is simple and reliable.

DESCRIPTION OF THE EMBODIMENTS

Figure 1:
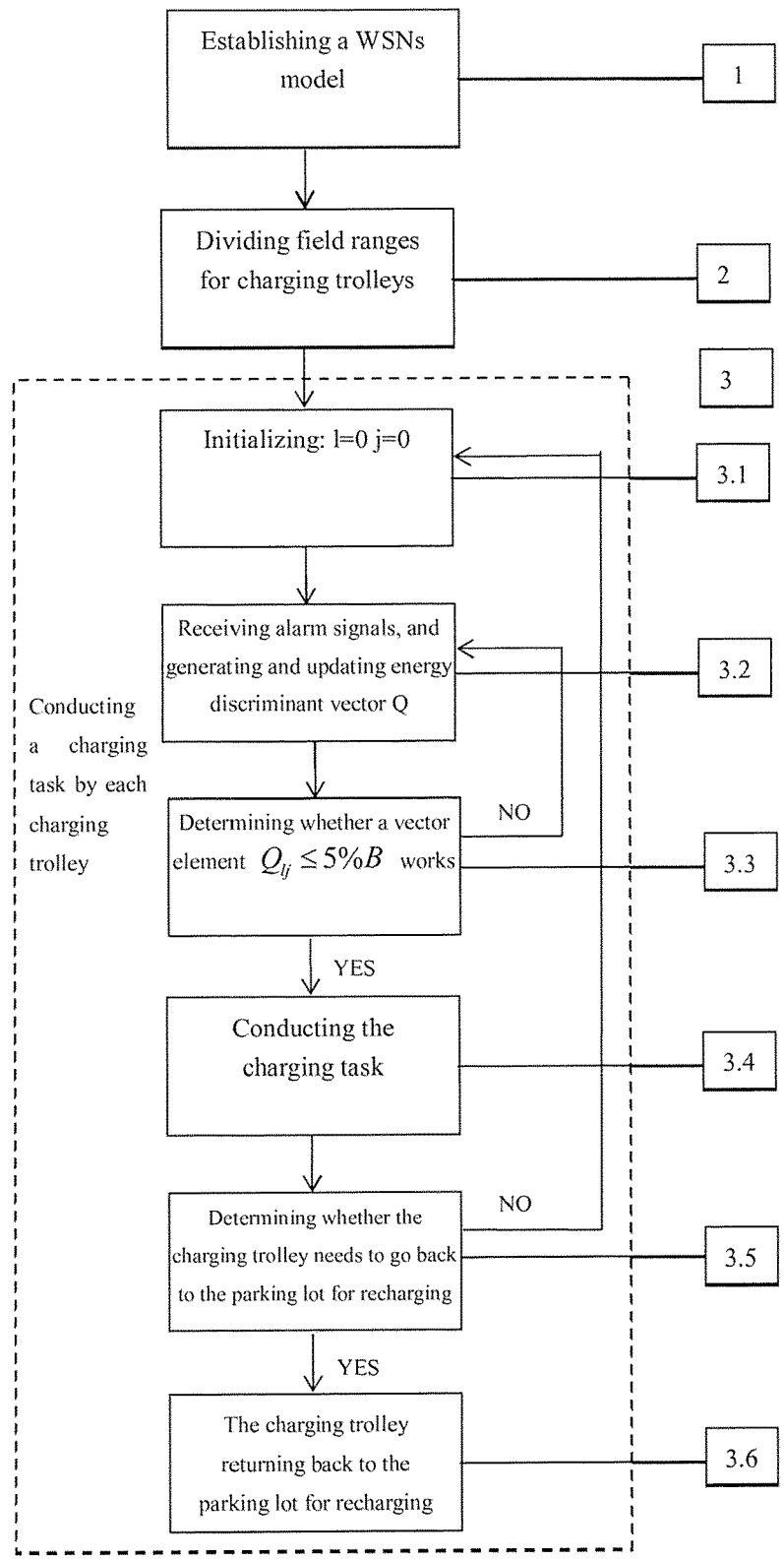
FIG. 1 is a flow chart illustrating a wireless sensor network charging method according to the invention.
Figure 2:
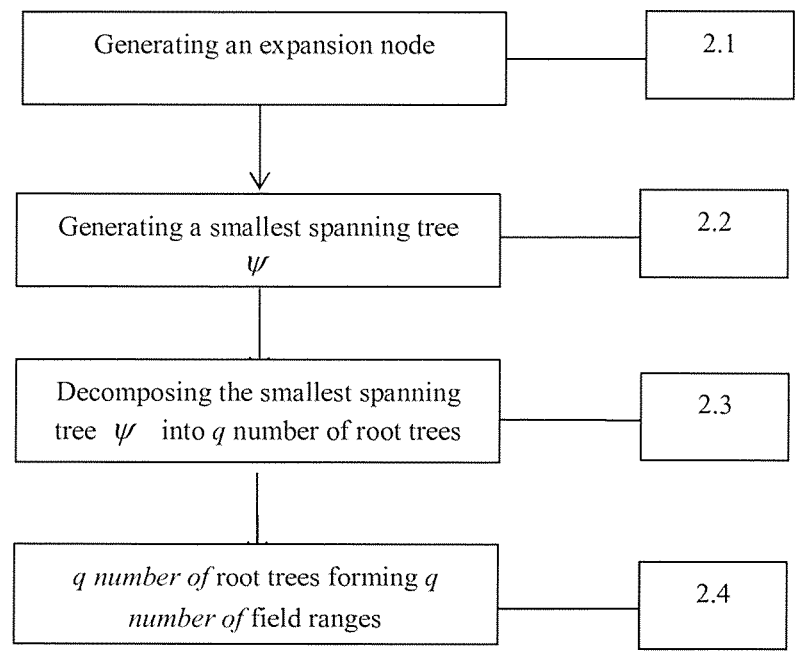
FIG. 2 is a block diagram illustrating the steps of dividing the field range for every charging trolley according to the invention.

The invention will now be described in detailed with reference to the preferred embodiments and accompanying drawings.

A wireless sensor network charging method for multi-charge nodes, including the following steps:

(1) establishing a WSNs model: by randomly distributing hundreds or thousands of sensors in a large surveillance area, with q number of charging trolleys and q number of parking lots q, wherein a surveillance cycle is T;

a set of sensors is V, that is: $v=\{v_1, v_2, v_3 \ldots\}$ and $v_1$, $v_2$ and $v_3$ are respectively a first, a second and a third sensors; a battery capacity of each sensor being B, a consumption rate of the $j^{th}$ sensor being $\rho_j$, a low energy alarm threshold being $M_j$, $M_j=\alpha \cdot B$, and $0<\alpha<1$, wherein $\alpha$ is a percentage of the low energy alarm threshold $M_j$ accounted for the sensor energy B;

i being a serial number of the charging trolley which is parked in the parking lot at a position $r_i$, $r_i=(x_i, y_i)$, $1 \leq i \leq q$, $x_i$ and $y_i$ respectively representing the two dimensional map coordinates of the position $r_i$, q being the quantity of the charging trolleys; a base station being used to collect sensor information and communicate with the charging trolleys; the parking lots being used to recharge the charging trolleys; the battery capacity of every charging trolleys being E, a moving speed being a stable value S, and a sensor charging time for every charging trolley being a fixed value C;

(2) dividing a field range for every charging trolley;

(3) conducting a charging task by each charging trolley.

Further, in the aforesaid step (2), detail steps of dividing the field range for every charging trolley are:

(2.1) generating an expansion node: by using a closed circuit q to encircle q number of charging trolleys and their parking lots in the sensor network, wherein the circuit η does not include other sensor node therein, thus the circuit η is the expansion node;

(2.2) by using the expansion node as a root node, the sensor node being the smallest spanning tree ψ generated by a tree branch node;

(2.3) decomposing the smallest spanning tree ψ: by taking q number of parking lots as the root nodes, decomposing the smallest spanning tree into q number of un-intersected root trees, and the upper limit for the total number of nodes in every root tree being:

$$K = \left\lceil \frac{A}{q} \right\rceil,$$

wherein A is the total number of sensor nodes in the sensor network, q is the quantity of charging trolleys, and $\lceil \cdot \rceil$ indicates to round up; A is the total number of sensor nodes in the sensor network;

(2.4) connecting outer surrounding nodes of every root tree to form q number of circuits $\zeta_1, \zeta_2 \ldots \zeta_q$, wherein the circuit $\zeta_i$ (i=1, 2, . . . , q) represents the field range of the $i^{th}$ charging trolley.

Further, in the aforesaid step (3), detail steps of conducting the charging task by each charging trolley are:

(3.1) the charging trolleys receiving a total number of alarm sensor nodes and a serial number of an alarmed sensor node, and initializing: l=0, j=0, wherein l is the total number of alarm sensor nodes being received, and j is the serial number of the alarmed sensor node.

(3.2) the charging trolleys starting to receive signals emitted from a low energy sensor, the charging trolleys updating the values of l,j after receiving the alarm signals and generating a charging path $s_l$ for every l value, and the charging trolleys calculating an energy discriminant vector Q, wherein l is the total number of alarm sensor nodes being received, and j is the serial number of the alarmed sensor node;

(3.3) if an element $Q_{lj}$ of the vector quantity is $\leq 5\%$ B and j=1, 2, . . . , l, wherein l is the total number of alarm sensor nodes being received, j is the serial number of the alarmed sensor node, and B represents the battery capacity of each sensor, then conducting the step (3.4) based on the shortest charging path $s_l$, otherwise, returning back to the step (3.2);

(3.4) conducting the charging tasks: that is, the charging trolleys start to charge the sensors;

(3.5) the charging trolleys determining whether returning back to the parking lots for recharging is required, and if it is required, then the charging trolleys return back to the parking lots for recharging; otherwise, returning back to the step (3.2).

In the aforesaid step (3.2), the method of generating the shortest charging path $s_l$ is: a set of all the alarmed sensors being $V^c=(v_1^c, v_2^c, v_3^c \ldots v_l^c)$; by using the charging trolleys as the start-point, selecting a path $e_m$ with the smallest Euclidean distance in l number of paths that connect with the charging trolley, wherein $e_m$ connects another alarmed sensor node $v_i^c$ with the charging trolleys; next, by using the sensor node $v_i^c$ as the start-point, selecting a path $e_n$ with the smallest Euclidean distance from the remaining l-1 paths which excludes the path $e_m$, wherein $e_n$ connects the alarmed sensor node $v_i^c$ with the alarmed sensor node $v_{i'}^c$; and in this analogy, obtaining the shortest charging path $s_l$ in which the charging trolleys are being used as the start-point and l number of to-be-charged sensor nodes are being passed by.

In the aforesaid step (3.2), the meaning of the energy discriminant vector Q is: a vector consisting of the minimum residual energy under conditions of assuming that the charging task starts when l number of alarm signals are received, and the $j^{th}$ alarmed sensor node is arranged to be charged at the last.

In the aforesaid step (3.2), the form of the energy discriminant vector Q is: $\lfloor Q_{l1}\ Q_{l2}\ \ldots\ Q_{lj}\ \ldots\ Q_{ll} \rfloor$, j=1, 2, . . . , l; and a method of calculating the element of $Q_{lj}$ of the energy discriminant vector is:

$$Q_{lj} = M_j - \rho_j \cdot \left[ \frac{D}{S} + l \cdot C + (t - t_j) \right],$$

wherein $M_j$ is a low energy alarm threshold, the threshold is set as $M_j=20\%$ B, B represents the battery capacity of each sensor, $\rho_j$ is an energy consumption rate of the $j^{th}$ alarmed sensor node, l is the total number of alarm sensor nodes being received, D is a total length of the shortest charging path corresponded by l, S is the moving speed of the charging trolleys, C is a charging time required each sensor, C is a constant value, t is the current time that the charging trolleys calculate the vector element, and $t_j$ is an alarming time of the $j^{th}$ alarm sensor node recorded by the charging trolleys.

In the aforesaid step (3.5), bases for the charging trolleys to determine whether returning back to parking lots for recharging, is required are: a remaining energy $E_\mu$ of the charging trolleys being $\leq 5\%$ E, wherein $E_\mu$ is assumed to be the energy remained in the charging trolleys after the charging trolleys returned back to parking lots to conduct the charging task again, and E is a battery capacity of the charging trolleys;

$E_\mu$ is calculated according to: $E_\mu = E' - (Q_{r \to r_i} + Q_c + \Delta Q)$, wherein E' is a remaining energy at the current moment when the charging trolleys made the determination, $Q_{r \to r_i}$ is an energy consumed while the charging trolleys completed the charging task and returned back to the parking lots, $\Delta Q$ is an extra energy loss by the charging trolleys under the influence of surrounding environment, and $Q_c$ is an energy expected to be consumed when conducting the charging task again.

$Q_c$ is calculated according to: $Q_c=\lambda \cdot D'+(l-l') \cdot B-(B'_{l'+1}+B'_{l'+2}+ \ldots B'_l)$, wherein $\lambda$ is an energy consumption of the charging trolleys per unit distance, l is the total number of alarm sensor nodes being received, l' represents a total number of alarm released sensor node at the moment that the charging trolleys made the determination, D' is a total length of the shortest path generated corresponding to l at the moment that the charging trolleys made the determination, $B'_{l'+1}$ is a remaining energy of the $l'+1^{th}$ alarm sensor node, $B'_{l'+2}$ is a remaining energy of the $l'+2^{th}$ alarm sensor node, $B'_{l'}$ is a remaining energy of the $l'^{th}$ alarm sensor node, B is the battery capacity of sensors.

What is claimed is:

1. A wireless sensor network charging method for multi-charge nodes, comprising the following steps:
   (1) establishing a wireless sensor network (WSNs) model: by randomly distributing hundreds or thousands of sensors in a large surveillance area, with q number of charging trolleys and q number of parking lots, wherein a surveillance cycle is T;
   a set of sensors being V, that is: $V=\{v_1, v_2, v_3 \ldots\}$ and $v_1$, $v_2$ and $v_3$ are respectively a first sensor, a second sensor and a third sensor; a battery capacity of each sensor being B, a consumption rate of a $j^{th}$ sensor being $\rho_j$, a low energy alarm threshold being $M_j$, $M_j=\alpha \cdot B$, and $0<\alpha<1$, wherein $\alpha$ is a percentage of the low energy alarm threshold $M_j$ accounted for the battery capacity B;
   i being a serial number of the charging trolley which is parked in the parking lot at a position $r_i$, wherein $r_i=(x_i, y_i)$, $1 \le i \le q$, $x_i$ and $y_i$ respectively represent two dimensional map coordinates of the position $r_i$, and q represents the quantity of the charging trolleys; a base station being used to collect sensor information and communicate with the charging trolleys; the parking lots being used to recharge the charging trolleys; the battery capacity of every charging trolleys being E, a moving speed being a stable value S, and a sensor charging time for every charging trolley being a fixed value C;
   (2) dividing a field range for every charging trolley; and
   (3) conducting a charging task by each charging trolley.

2. The wireless sensor network charging method for multi-charge nodes according to claim 1, wherein in the step (2), detail steps of dividing the field range for every charging trolleys comprise:
   (2.1) generating an expansion node: by using a closed circuit $\eta$ to encircle q number of charging trolleys and q number of parking lots corresponded thereby in the sensor network, wherein the circuit $\eta$ does not include other sensor node therein;
   (2.2) by using the expansion node as a root node, the sensor node being a smallest spanning tree $\psi$ generated by a tree branch node;
   (2.3) decomposing the smallest creation tree $\psi$: by taking the q number of parking lots as root nodes, decomposing the smallest spanning tree into q number of unintersected root trees, and the upper limit for the total number of nodes in every root tree being:

$$K = \left\lceil \frac{A}{q} \right\rceil,$$

wherein A is a total number of sensor nodes in the sensor network, q is the quantity of the charging trolleys, and $\lceil \cdot \rceil$ indicates to round up; and (2.4) connecting outer surrounding nodes of every root tree to form q number of circuits $\zeta_1, \zeta_2 \ldots \zeta_q$, wherein the circuit $\zeta_i (i=1, 2, \ldots, q)$ represents the field range of an $i^{th}$ charging trolley.

3. The wireless sensor network charging method for multi-charge nodes according to claim 1 wherein in the step (3), detailed steps of conducting the charging task by each charging trolley comprise:
   (3.1) receiving a total number of alarm sensor nodes and a serial number of an alarmed sensor node by the charging trolleys, and initializing: l=0, j=0, wherein l is a total number of alarm sensor nodes being received, and j is a serial number of an alarmed sensor node;
   (3.2) receiving signals emitted from a low energy sensor, updating values of l, j after receiving the alarm signals, generating a shortest charging path $s_l$ for every l value, and calculating an energy discriminant vector Q by the charging trolleys;
   (3.3) if an element $Q_{lj}$ of the energy vector satisfies $Q_{lj} \le 5\%$ B and j=1, 2, $\ldots$, l, then conducting the step (3.4) based on the shortest charging path $s_l$, otherwise, returning back to the step (3.2);
   (3.4) conducting the charging tasks: that is, the charging trolleys start to charge the sensors; and
   (3.5) determining by the charging trolleys on whether returning back to the parking lots for recharging is required, and it is if required, then the charging trolleys return back to the parking lots for recharging; otherwise, returning back to the steps (3.2).

4. The wireless sensor network charging method for multi-charge nodes according to claim 3, wherein in the step (3.2), a method of generating the shortest charging path $s_l$ comprises:
   a set of alarmed sensors being $V^c=(v_1^c, v_2^c, v_3^c \ldots v_l^c)$;
   by using the charging trolleys as a start-point, selecting in a path $e_m$ with the smallest Euclidean distance in l number of paths that connect with the charging trolleys, wherein $e_m$ connects another alarmed sensor node $v_i^c$ with the charging trolleys;
   by further using the sensor node $v_i^c$ as the start-point, selecting a path $e_n$ with the smallest Euclidean distance from the remaining l-1 paths which excludes the path $e_m$, wherein $e_n$ connects the alarmed sensor node $v_i^c$ and the alarmed sensor node $v_i^c$; and
   obtaining the shortest charging path $s_l$ in which the charging trolleys are being used as the start-point and l number of to-be-charged sensor nodes are being passed by.

5. The wireless sensor network charging method for multi-charge nodes according to claim 3, wherein in the step (3.2), the energy discriminant vector Q is defined by: a vector consisting of the minimum residual energy under conditions of assuming that the charging task starts when l number of alarm signals are received, and a $j^{th}$ alarmed sensor node is arranged to be charged at the last.

6. The wireless sensor network charging method for multi-charge nodes according to claim 5, wherein in the step (3.2), the form of the energy discriminant vector Q is: $\lfloor Q_{l1}$ $Q_{l2} \ldots Q_{lj} \ldots Q_{ll} \rfloor$, j=1, 2, $\ldots$ l; and a method of calculating the element $Q_{lj}$ of the energy discriminant vector is:

$$Q_{lj} = M_j - \rho_j \cdot \left[ \frac{D}{S} + l \cdot C + (t - t_j) \right],$$

wherein $M_j$ is a low energy alarm threshold, the threshold is set as $M_j=20\%$ B, B represents the battery capacity of each sensor, $\rho_j$ is an energy consumption rate of the $j^{th}$ alarmed sensor node, l is the total number of alarm sensor nodes being received, D is a total length of the shortest charging path corresponded by l, S is the moving speed of the charging trolleys, C is a charging time required each sensor, C is a constant value, t is the current time that the charging trolleys calculate the vector element, and $t_j$ is alarming time of a $j^{th}$ alarm sensor node recorded by the charging trolleys.

7. The wireless sensor network charging method for multi-charge nodes according to claim 3, wherein in the step (3.5), bases for the charging trolleys to determine whether returning back to the parking lots for recharging is required comprise:

a remain energy $E_\mu$ of the charging trolleys satisfies $E_\mu \leq 5\%$ E, wherein $E_\mu$ is assumed to be an energy remained in the charging trolleys after the charging trolleys returned back to the parking lots to conduct the charging task again, and E is a battery capacity of the charging trolleys;

$E_\mu$ being calculated according to: $E_\mu = E' - (Q_{r \to r_i} + Q_c + \Delta Q)$, wherein E' is a remaining energy at current moment when the charging trolleys made the determination, $Q_{r \to r_i}$ is an energy consumed while the charging trolleys completed the charging task and returned back to the parking lots, $\Delta Q$ is an extra energy loss by the charging trolleys under the influence of surrounding environment, and $Q_c$, is an energy expected to be consumed when conducting the charging task again; and $Q_c$ being calculated according to: $Q_c = \lambda \cdot D' + (l-l') \cdot B - (B'_{l'+1} + B'_{l'+2} + \ldots B'_l)$, wherein $\lambda$ is an energy consumption of the charging trolleys per unit distance, l is the total number of alarm sensor nodes being received, l' represents a total number of alarm released sensor nodes at the moment that the charging trolleys made the determination, D' is a total length of the shortest charging path generated corresponding to l at the moment that the charging trolleys made the determination, $B'_{l'+1}$ is a remaining energy of a $l'+1^{th}$ alarm sensor node, $B'_{l'+2}$ is a remaining energy of a $l'+2^{th}$ alarm sensor node, $B'_{l'}$ is a remaining energy of a $l'^{th}$ alarm sensor node, and B is the battery capacity of the sensors.

8. The wireless sensor network charging method for multi-charge nodes according to claim 2, wherein in the step (3), detailed steps of conducting the charging task by each charging trolley comprise:

(3.1) receiving a total number of alarm sensor nodes and a serial number of an alarmed sensor node by the charging trolleys, and initializing: l=0, j=0, wherein l is a total number of alarm sensor nodes being received, and j is a serial number of an alarmed sensor node;

(3.2) receiving signals emitted from a low energy sensor, updating values of l, j after receiving the alarm signals, generating a shortest charging path $s_l$ for every l value, and calculating an energy discriminant vector Q by the charging trolleys;

(3.3) if an element $Q_{lj}$ of the energy vector satisfies $Q_{lj} \leq 5\%$ B and j=1, 2, . . . , l, then conducting the step (3.4) based on the shortest charging path $s_l$, otherwise, returning back to the step (3.2);

(3.4) conducting the charging tasks: that is, the charging trolleys start to charge the sensors; and (3.5) determining by the charging trolleys on whether returning back to the parking lots for recharging is required, and it is if required, then the charging trolleys return back to the parking lots for recharging; otherwise, returning back to the steps (3.2).

* * * * *